US008056052B2

(12) United States Patent
Deshpande et al.

(10) Patent No.: US 8,056,052 B2
(45) Date of Patent: Nov. 8, 2011

(54) POPULATING SERVICE REQUESTS

(75) Inventors: Prasad Manikarao Deshpande, Mumbai (IN); Krishna Kummamuru, Hyderabad (IN); Vijay Krishnarao Naik, Pleasantville, NY (US); Biplav Srivastava, Uttar Pradesh (IN); Raghavendra Uppinakuduru Udupa, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1173 days.

(21) Appl. No.: 11/421,869

(22) Filed: Jun. 2, 2006

(65) Prior Publication Data
US 2007/0283029 A1 Dec. 6, 2007

(51) Int. Cl.
*G06F 9/44* (2006.01)
(52) U.S. Cl. ......... 717/107; 717/104; 717/106; 717/108
(58) Field of Classification Search .................. None
See application file for complete search history.

(56) References Cited

U.S. PATENT DOCUMENTS

| 7,877,726 | B2 * | 1/2011 | Sabbouh ........................ 717/106 |
| 7,895,566 | B2 * | 2/2011 | Shenfield et al. ............... 717/107 |
| 7,904,880 | B2 * | 3/2011 | Srinivasan et al. ............. 717/108 |
| 7,917,890 | B2 * | 3/2011 | Barcellona .................... 717/106 |
| 2003/0135650 | A1 * | 7/2003 | Kano et al. .................... 709/248 |
| 2003/0223734 | A1 | 12/2003 | Cooper, Jr. et al. |
| 2004/0268302 | A1 * | 12/2004 | Srivastava et al. ............ 717/108 |
| 2005/0071276 | A1 * | 3/2005 | Bruchlos et al. ................ 705/51 |
| 2005/0278348 | A1 * | 12/2005 | Falter et al. .................... 707/100 |
| 2006/0047626 | A1 * | 3/2006 | Raheem ............................ 707/2 |
| 2006/0085452 | A1 | 4/2006 | Cope |
| 2006/0101474 | A1 * | 5/2006 | Magown ........................ 719/315 |
| 2006/0161888 | A1 * | 7/2006 | Lovisa et al. .................. 717/107 |

FOREIGN PATENT DOCUMENTS
WO    WO2006019539 A2    2/2006

OTHER PUBLICATIONS

"Code generation techniques for developing light-weight XML Web services for embedded devices", R. van Engelen, Mar. 2004, pp. 854-861, <http://delivery.acm.org/10.1145/970000/968075/p854-van_engelen.pdf>.*
"Model driven distribution pattern design for dynamic web service compositions", Barrett et al., Jul. 2006, pp. 129-136, <http://delivery.acm.org/10.1145/1150000/1145612/p129-barrett.pdf>.*

* cited by examiner

*Primary Examiner* — Thuy Dao
(74) *Attorney, Agent, or Firm* — Gibb I.P. Law Firm, LLC; Derek S. Jennings

(57) ABSTRACT

A method, apparatus, architecture and computer program product for populating a service request is disclosed. A service request is modeled to determine the steps involved. The data is missing from a service request for each step of the request is assessed. The data sources for the modeled request are identified. The relevant data is extracted from the identified data sources. The service request is populated with the extracted data. A service request is executed by executing at least one process step acting on the populated service request.

17 Claims, 9 Drawing Sheets

POPULATING SERVICE REQUESTS

FIELD OF THE INVENTION

The present invention relates to populating service requests, typically as occurs in change management of computing systems/infrastructure.

BACKGROUND

Large and small-scale computing systems require changes to be made almost on a daily basis. These changes can be of various types, such as replacing, adding or upgrading software components, and reconfiguration.

The implementation of these changes is performed by generating a service request handled by a change management system. A service request captures the description of the change and its history. The change itself goes through various steps, such as change creation, information gathering, approval, and actioning. Different people or processes typically work on a change at different stages in the process flow. The process flow often is a combination of automated and manual change implementation.

A common problem faced is that a change request has insufficient or missing data. In such situations, the person performing a process step may have to spend a lot of time collecting the required information, which may be spread over many different sources. Sometimes this knowledge resides only in the minds of people working on the computing system in question and is not otherwise captured or recorded anywhere.

It would therefore be advantageous to provide for an automated approach to populating service requests that contain missing data, and to recover at least some of any missing data.

SUMMARY

A method, apparatus, architecture and computer program product for populating a service request is disclosed. A service request is modeled to determine the steps involved. The data is missing from a service request for each step of the request is assessed. The data sources for the modeled request are identified. The relevant data is extracted from the identified data sources. The service request is populated with the extracted data.

A service request is executed by executing at least one process step acting on the populated service request.

BRIEF DESCRIPTION OF THE DRAWINGS

Aspects of the present invention will now be described, by way of example only, with reference to the accompanying drawings, in which.

DETAILED DESCRIPTION

Figure 1:
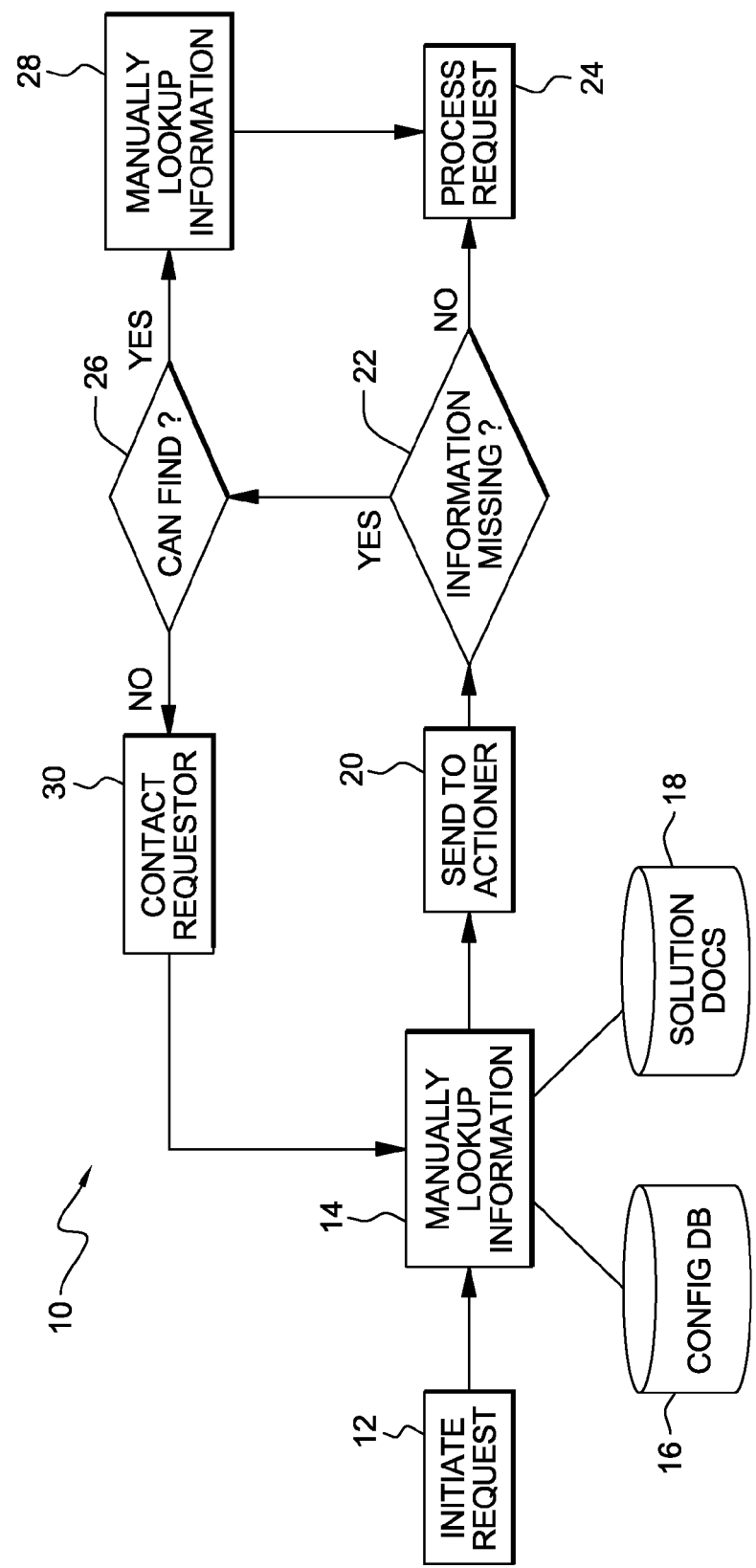
FIG. 1 is a schematic representation of a conventional service request process.

Where reference is made in any one or more of the accompanying drawings to steps and/or features, which have the same reference numerals, those steps and/or features have for the purposes of this description the same function(s) or operation(s), unless the contrary intention appears.

Introduction

FIG. 1 shows the process flow 10 of a conventional service request process. The blocks represented with shading are performed by a requester, whereas the non-shaded blocks are performed by the actioner.

In step 12, a requester initiates a request. In step 14, any missing data from the request needs to be manually looked-up. This can involve searching sources, such as a configuration database 16 and a documents store 18. Once the missing information has been retrieved, then in step 20, the populated request is sent to the actioner. In step 22, the actioner determines whether there still is any missing information in the populated service request. If 'No', then in step 24, the process request is serviced. If 'Yes', on the other hand, then it is determined in step 26 whether the missing information can be found by the actioner. If 'Yes', then the missing information is manually looked-up in step 28, after which the process request is actioned in step 24. If 'No', on the other hand, then the actioner contacts the requester in step 30, then the flow returns to step 14.

That is, the 'process request' operation can only be performed in step 24 if all of the service request information is present. In some instances, the actioner is able to manually look-up any missing information (i.e. in step 28), however, that will not be possible in all situations, and in such a case the requester will be required to provide that missing information. As will be appreciated, this operation is cumbersome and inefficient.

Overview of an Embodiment

Figure 2:
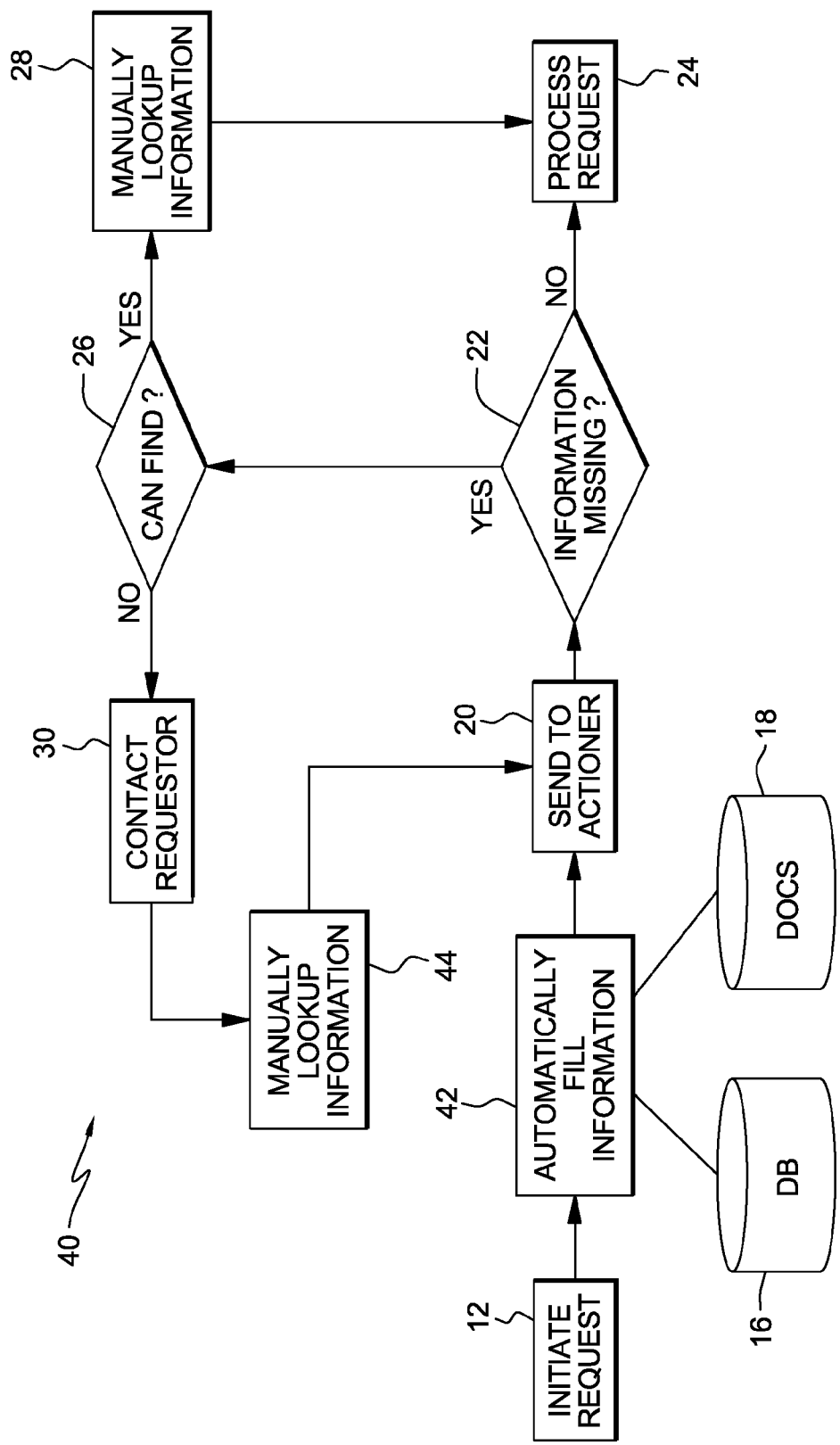
FIG. 2 is a schematic representation of a service request process according to an embodiment of the invention.

Turning then to FIG. 2, a service request process 40 embodying the invention, is shown. The process steps in common with FIG. 1 have the same reference numerals, and are performed in the same manner as described above.

In step 42, a service request is processed to automatically populate any missing data, drawing on sources such as the configuration database 16 and the documents store 18. Other information and contexts are drawn upon in executing this step, as will be described below. In the situation where there still is missing data from a service request (i.e. notwithstanding the automated population of the service request by the requester in step 42), then the actioner still contacts the requester in step 30 to obtain that information, and that information must be manually looked-up by the requester in step 44 to complete the service request to be sent to the actioner in step 20. However, the number of manual looked-up processes that will need to be performed will be greatly reduced over the conventional arrangement of FIG. 1.

Populating a Service Request

Figure 3:
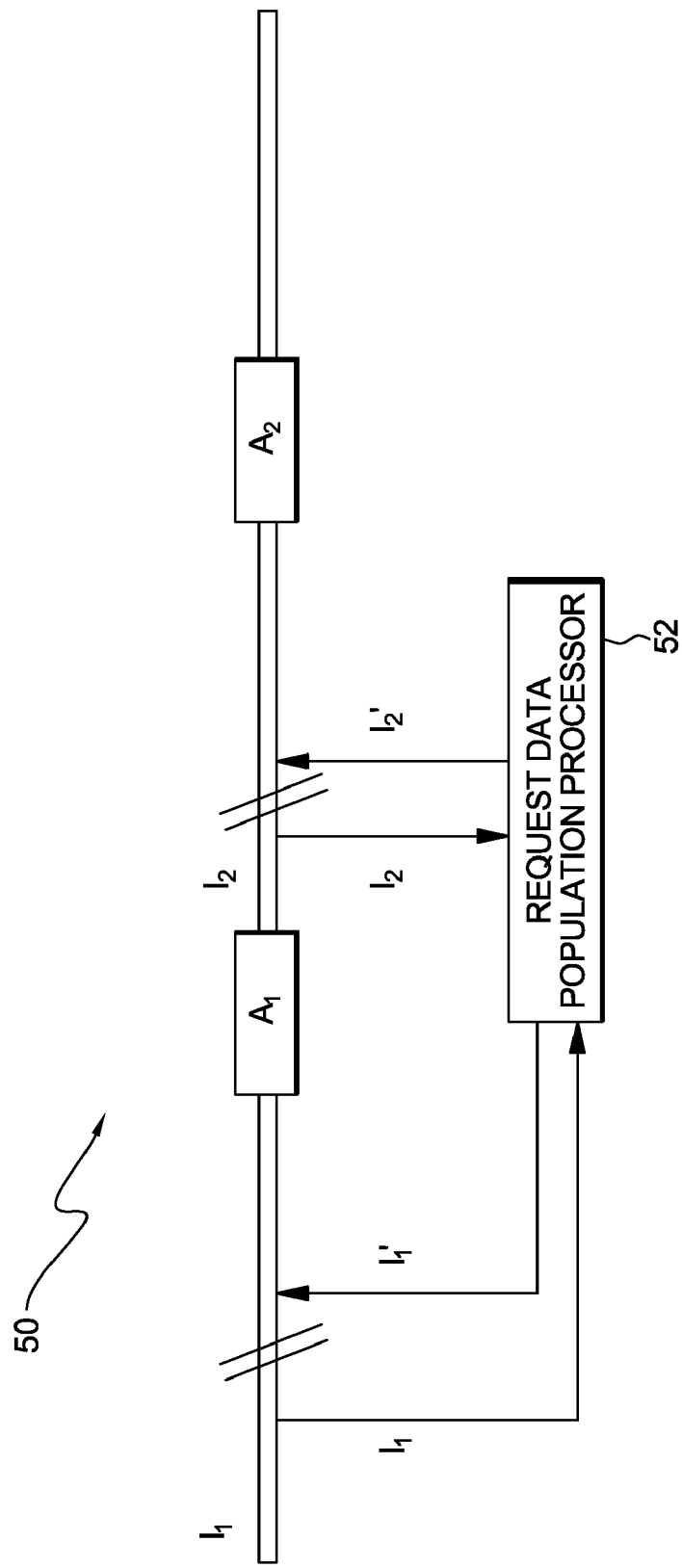
FIG. 3 is a schematic representation of a generic service request execution process.

Turning now to FIG. 3, there is shown a schematic representation of a generic service request execution process 50. A service request includes certain data, $I_1$, intended to be acted on by a process step $A_1$. The process output from $A_1$ is data $I_2$, in turn provided to process step $A_2$.

In accordance with the embodiment, data $I_1$ is passed to a request data population processor 52, such that any missing information is identified and sought to be located to populate the service request with at least some of any such missing data. The resultant populated data $I_1'$ is returned and passed to process step $A_1$. Similarly, data, $I_2$, is passed to the processor 52 to populate at least some of any missing data and returned as data $I_2'$ to process step $A_2$.

Processor Architecture

Figure 4:
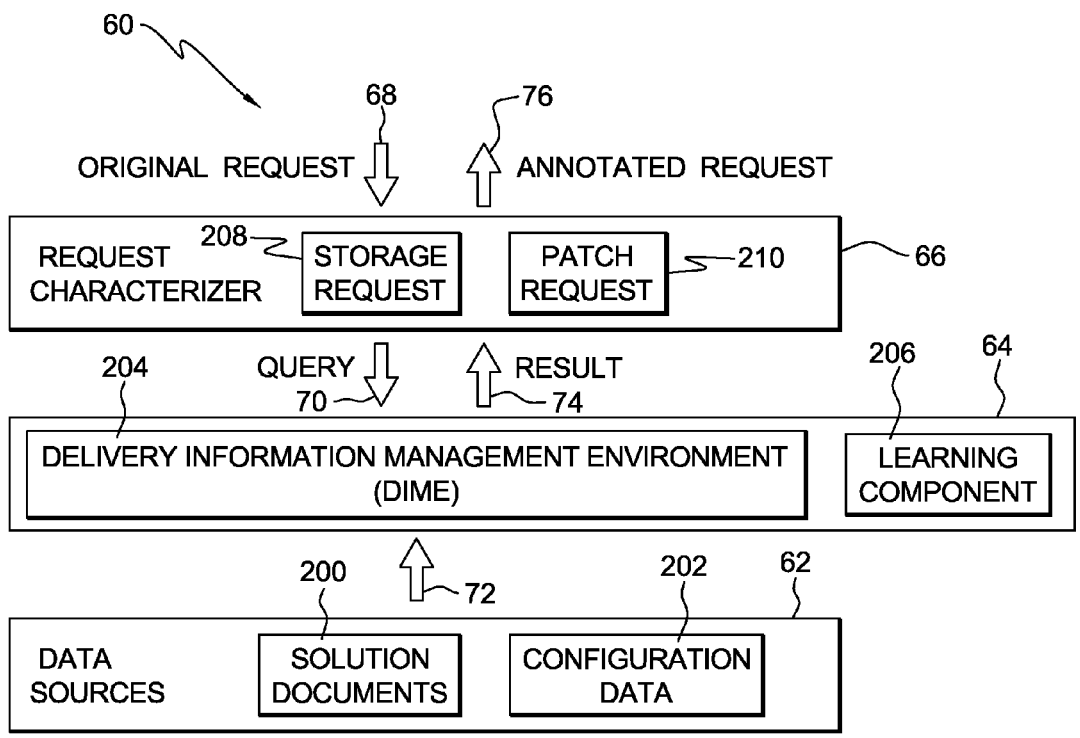
FIG. 4 is a schematic representation of an architecture implementing population of missing data in a service request.

Turning now to FIG. 4, there is shown an architecture 60 that embodies the request data population processor 52. The architecture 60 comprises of three layers: a data source layer 62; an extraction and learning layer 64; and a request characteriser layer 66. A service request 68 is received at the request characteriser layer, and once characterised is passed as a query 70 to the extraction and learning layer 64. The extraction and learning layer 64 draws on information 72 from the data sources layer 62, and returns a result 74 to the request characteriser layer 66. The request characteriser layer 66 then outputs an annotated service request 76.

Figure 5:
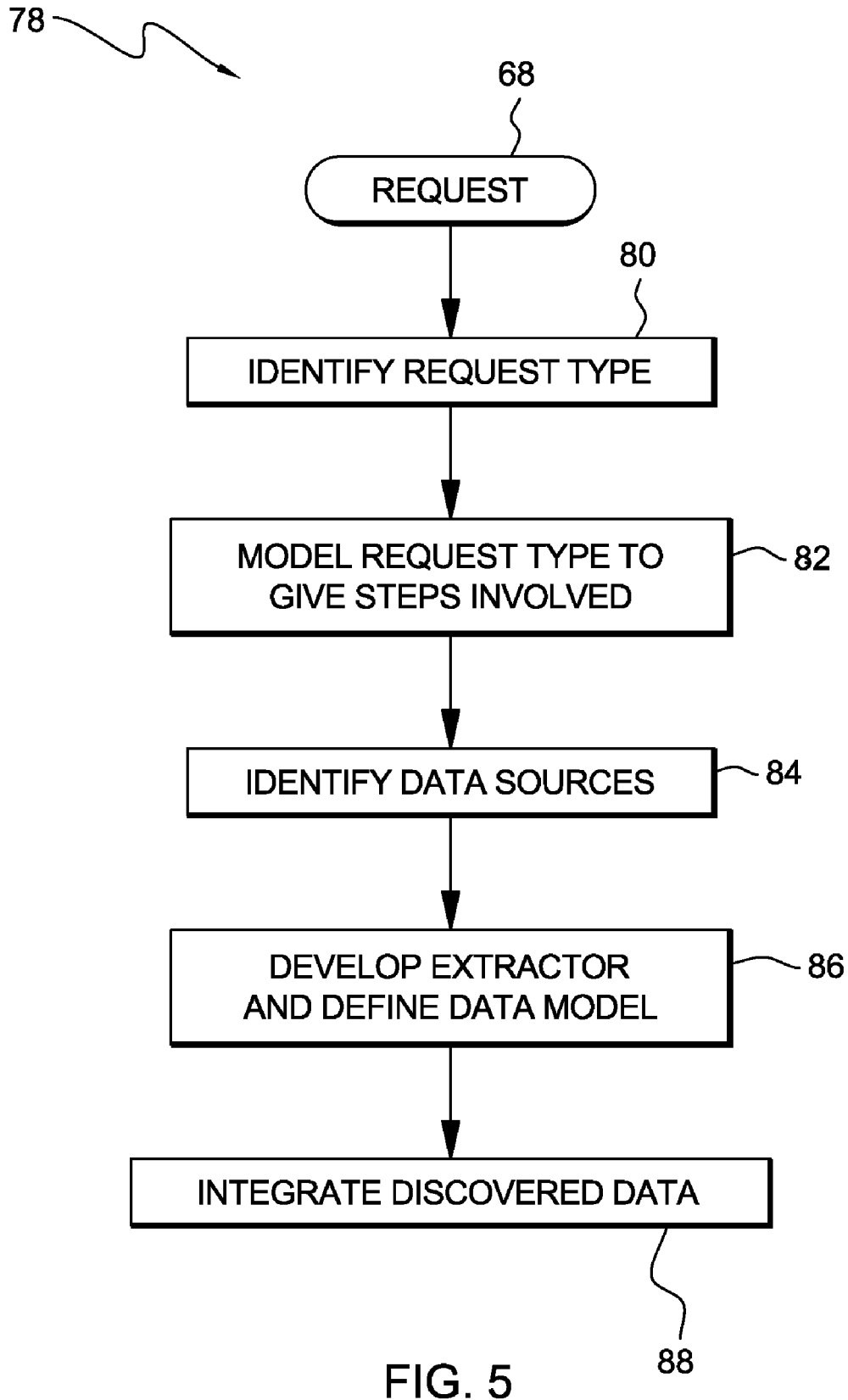
FIG. 5 is a schematic flow diagram of operation of the architecture of FIG. 4.

Referring now to FIG. 5, the broad operation of the architecture 60 will be firstly described. In the process flow 78, an original service request 68 is firstly identified in step 80 for 'type'. In step 82, the determined request type is modeled to determine the steps involved. The relevant data sources for any missing data then are identified in step 84. Next, a data extractor is developed and a relevant data model is defined in step 86 to assess what data is missing from each step of the request and extract the data from the sources and represent it in an actionable format.

The determination of what information is missing from the original request 68, occurring in step 86, is based on domain knowledge and studying the current state of the process. For each type of request, the information needed for each step in the request is known, based on previous interviews of practitioners and from other documentation. The information available in the service request 68 similarly is obtained from domain knowledge. Based on these two, it can be determined what information is missing from the service request 68 within the request characterizer 66.

In step 88, the service request workflow is modified to query the data extracted in step 86 and populate at least some of any missing data in the service request.

FIG. 5 shows pre-processing steps that occur to establish a modified workflow. Any subsequent request 68 is processed using that modified workflow.

EXAMPLE

Figure 6:
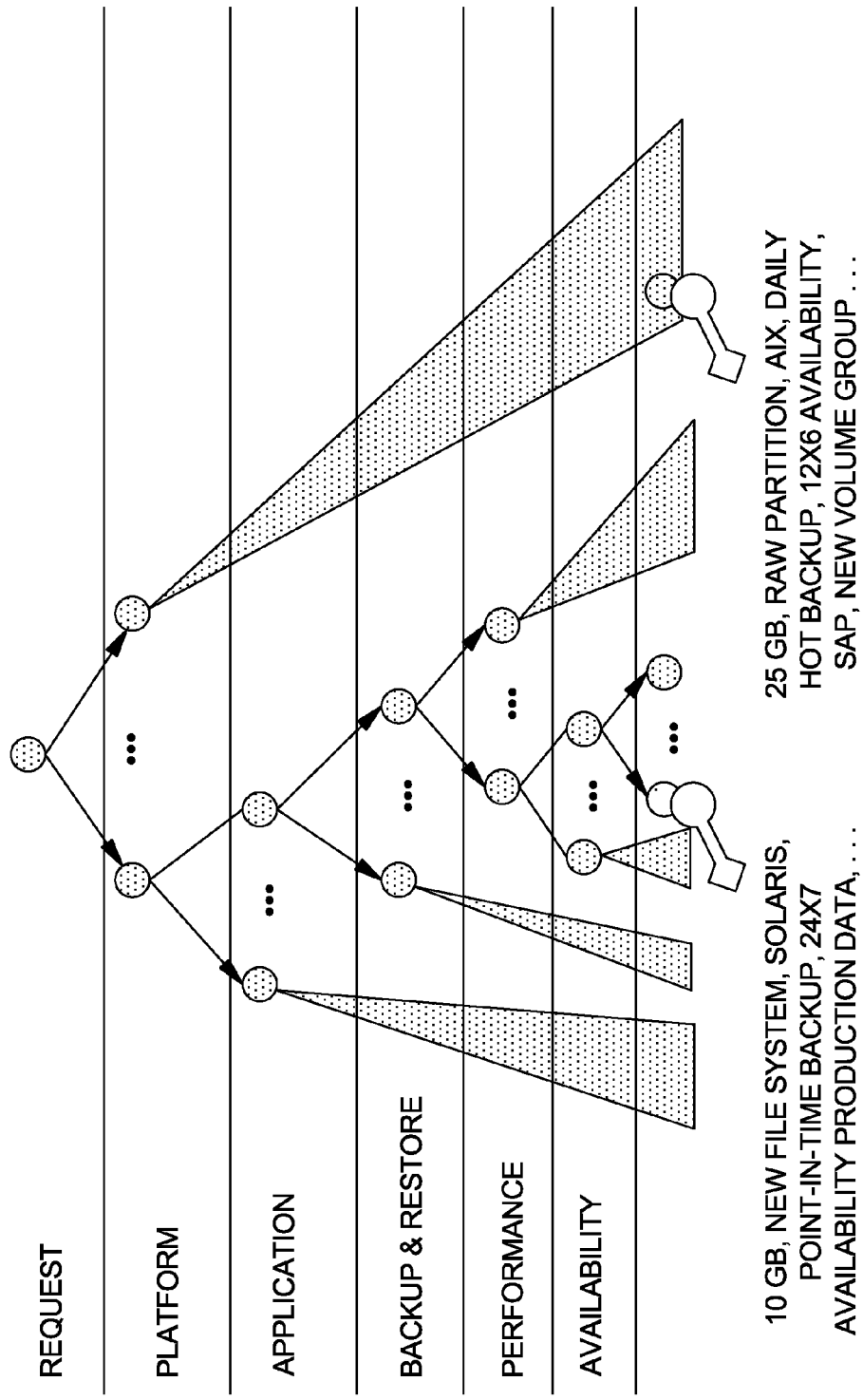
FIG. 6 is a tree-structure representation of possible storage requests.

The example that follows relates to storage requests. Storage request handling is a complex task since there are a number of ways in which a request can be processed. Consider a simple request such as "Extend file system A by 10 GB". This request can be fulfilled in multiple ways, and for example:

Allocate 10 GB extra from the logical volume to the file system
    If logical volume is full, extend the logical volume
    If logical volume cannot be extended, add more physical volumes to the volume group Requirements such as backup/copy settings can further increase the complexity. For example, if backup is enabled, then addition of a logical unit number (LUN) requires the addition of a paired LUN. This kind of analysis needs to be done while a change request is being created. To do this analysis, the requestor has to lookup a variety of information that is distributed in multiple sources. In this case, the information includes the following:

1. What is the storage solution used for file system A
2. Current configuration information for that system
3. Current state of that system (whether space is available in the logical volume, etc)
4. Backup/Copy requirements
5. Availability requirements Consider a Fibre Channel-based storage area network (SAN) storage solution, having attached IBM TotalStorage Enterprise Storage Server (ESS) storage arrays on McData Intrepid directors in the example. The different kinds of requests 68 that can arise for this storage system are:

Add Storage
        On existing server
            Upgrading a ESS box
            New ESS box is required
            Existing ESS box
        On new server
            Upgrading a ESS box
            New ESS box is required
            Existing ESS box
    Add Server to SAN Environment
    Add ESS Box
    Add new path from the server to the ESS Box (Multipathing)
    Add new fiber channel card
    Upgrade McData director
        Upgrade Microcode
        Upgrade License
        Upgrade No. of Ports
    Upgrade ESS Box
        Upgrade Microcode
        Upgrade License
        Upgrade disk packs
    Upgrade HBA
    Decommission
        Storage for a server
        Server
        ESS box
        McData director
    Remove a path from a server to the ESS box The various requirements for such a storage system are listed below:

Core Storage Requirements (mirroring, raid level, volume size, raw partition, new file system, new volume group, file system expansion, etc)
    Application Specific Requirements (database, groupware, business app, etc)
    Platform Specific Requirements (NFS mount)
    Backup and Restore Requirements (cold, hot, point-in-time, etc)
    Security Requirements (encryption, permissions)
    Alert Requirements (alert level)
    Performance Requirements (dual pathing, cache, etc)
    Availability Requirements (6×12, 7×24, outage window)
    Failover Requirements (HA, manual)
    Disaster Recovery Requirements
    Special Requirements (HSM, Archive service)
    Reporting Requirements As shown in FIG. 6, these requirements lead to an explosion in the complexity of processing a request. Each request will follow a particular path in the tree. FIG. 6 shows two specific solutions among the many that are possible and valid.

Drawing on this set of requests, the request type is identified, based on predetermined domain knowledge (i.e. step 80 in FIG. 5).

For each request type, the details of the various steps involved in the request and information needed by that step are determined by creating a detailed model (i.e. step 82 in FIG. 5). In this embodiment a WBI modeler is used to create a model for the workflow. The WBI modeler is a software tool from IBM (see <http://www-306.ibm.com/software/integration/wbimodeler/>, incorporated herein by reference). In such a tool the activities performed at the different steps, the roles that perform the activities, the information a role used to do the activity, the organizations that are involved and such information is captured.

The process of defining the data model is to identify precisely the information needs for different kinds of requests and define classes appropriately to represent that information. The information needs for different kinds of requests are derived from domain knowledge. The modeling is done using data modeling tools such as Unified Modeling Language (see <http://www.uml.org/>) or Eclipse Modeling Framework (see <http://www.eclipse.org/emf/>). In this example, an Eclipse based EMF modeling tool has been used. The DIME module 204 has an adapter for the Solution documents 200 and the McData Director 202.

Figure 7:
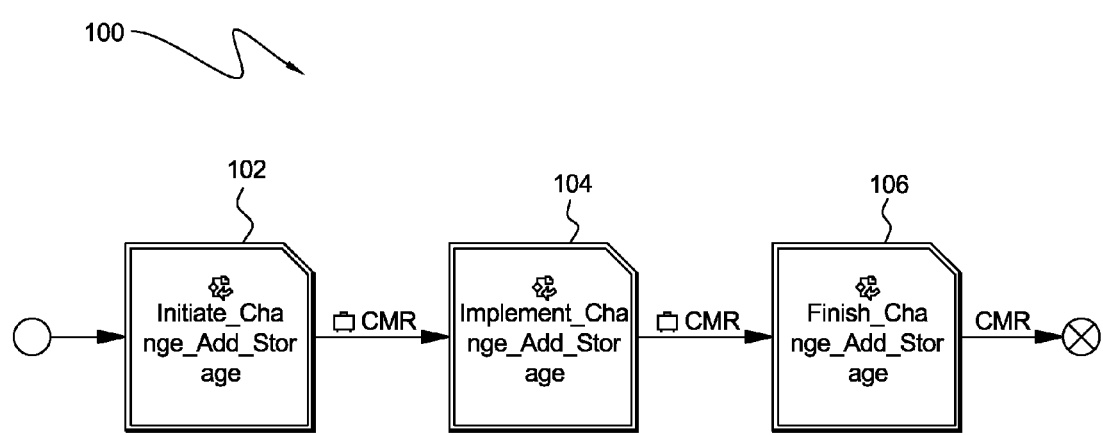
FIG. 7 is a schematic representation of a workflow model.

FIG. 7 shows an example high level WBI Model for an "Add Storage" request, being the process for allocating storage to a business application or database or groupware running on a UNIX or Windows server. The request is for extending a file system or raw partition, and is raised by a business application team or database team or groupware team. As noted above, the server is in a SAN environment and the storage is allocated on an ESS machine also in the same SAN environment. The model step 102 indicates the first stage of initiating 'a add storage' request. The step 104 indicates the stage of actually performing the 'add storage'. The step 106 indicates the final stage after the request is carried out.

Figure 8:
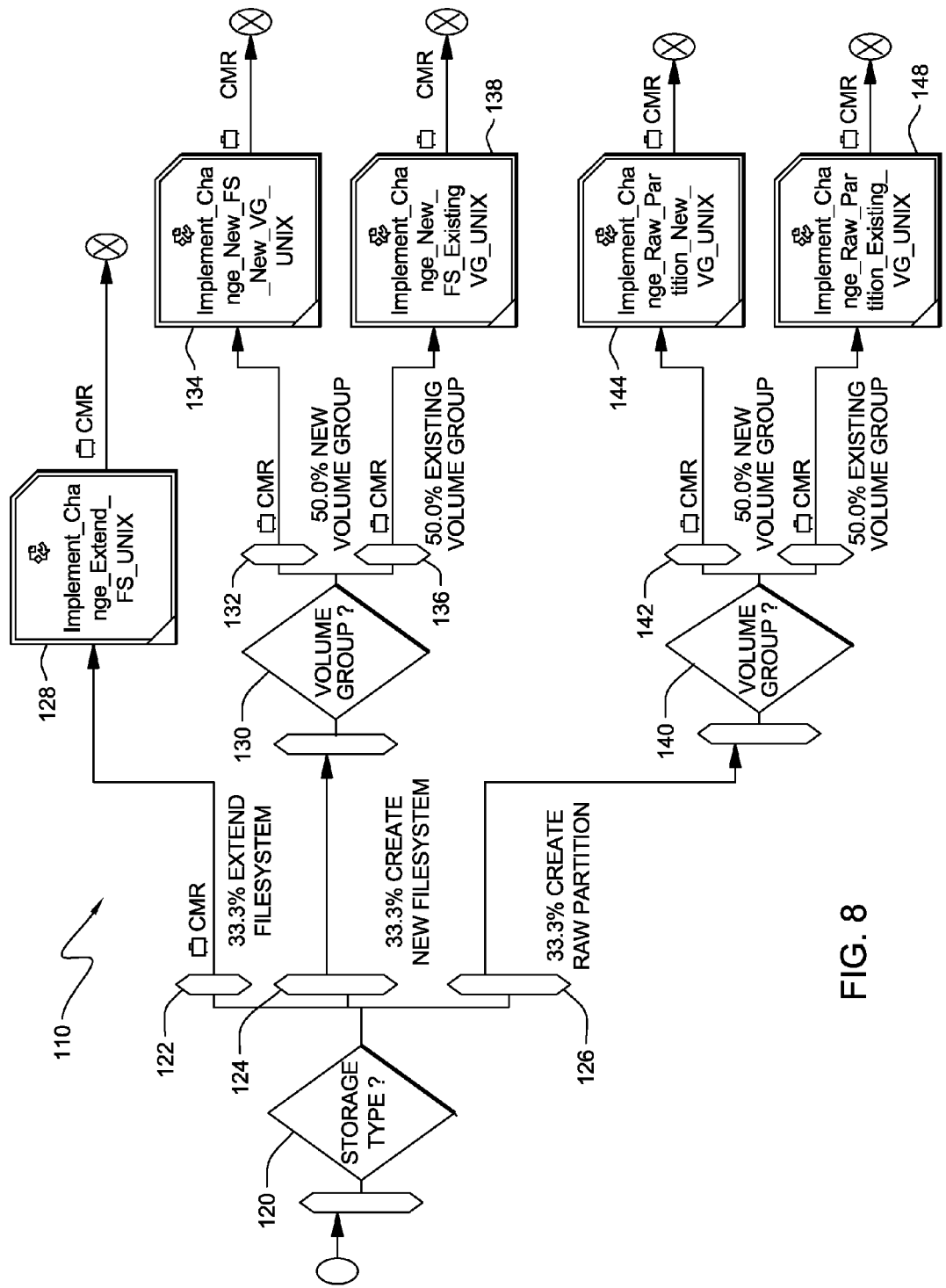
FIG. 8 is a schematic representation of extractor process steps.

Each of these steps is a sub-process that can be drilled down to reveal further details of that step. FIG. 8 shows the details of a sub-process 110 obtained by drilling down several levels. FIG. 8 specifically shows the processing flow for a 'add storage' request when the storage is to be added on an existing ESS Box and the platform is UNIX.

The first step 120 is to check the storage type: whether it is a file system or a raw partition. If a file system, then storage can be added by either extending the file system 122 (possible 33.3% of the times) or creating a new file system 124 (33.3%). The remaining 33.3% of the times, the storage type is a raw partition, in which case a new raw partition 126 needs to be created.

The "extend file system" branch is implemented by executing the sub-process "Implement_Change_Extend_FS_UNIX" 128.

For the "create new filesystem" branch, another check step 130 is made to see if an existing volume group can be used or a new volume group needs to be created. If the existing volume group can be used in step 132, (possible 50% of the times) , then the sub-process "Implement_Change_New_FS_Existing_VG_UNIX" 134 is executed. If a new volume group needs to be created, in step 136, then the sub-process "Implement_Change_New_FS_New_VG_UNIX" 138 is executed.

For the "Create raw partition" branch, a check 140 if existing volume group can be used or a new one needs to be created is made. If the existing volume group can be used 142 (possible 50% of the time), then the sub-process "Implement_Change_Raw_Partition_Existing_VG_UNIX" 144 is executed. If the new volume group needs to be created 146, then the sub-process "Implement_Change_Raw_Partition_New_VG_UNIX" 148 is executed.

Data layer 62

Step 84 of FIG. 5, dealing with the identification of the data sources, is now described. Referring also to FIG. 4, the data sources are:

Solution documents 200 that describe the storage solution used for the corresponding account and the various requirements Configuration information 202 for the storage system—this is available from the McData Director.

Extraction and Learning Layer 64

Figure 9:
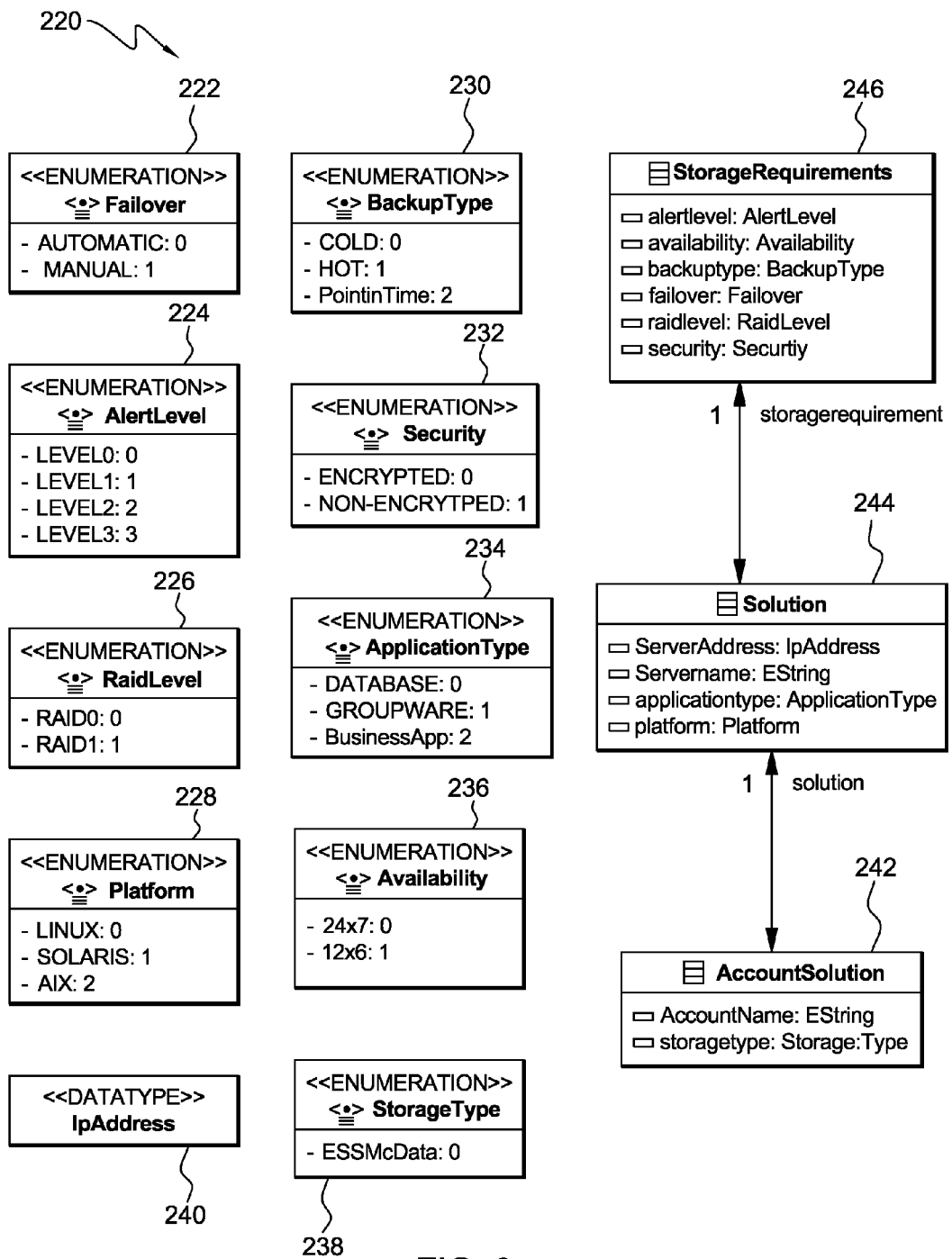
FIG. 9 is a schematic representation of a data model.

The DIME module 204 extracts this data and stores the data using the data model defined above (i.e. step 86 in FIG. 5). A subset 220 of the data model 110 is shown in FIG. 9. The data model captures the information about the storage solution and the current state of the system.

FIG. 9 shows the data model 220 for the information. The data model 220 is depicted using the Eclipse Modeling Framework (EMF) diagram. Some of the components are types and others are class descriptions.

Enumeration Types:

Failover 222: can be Automatic or Manual.

AlertLevel 224: there are four alert levels: Level0, Level1, Level2 and Level3

RaidLevel 226: this can be RAID level 0 or RAID level 1. (RAID is a short form for Redundant Array of Inexpensive Disks)

Platform 228: indicates the Operating System which can be Linux, Solaris or AIX BackupType 230: indicates the various types of backup strategies—hot, cold or point in time Security 232: indicates whether the data is encrypted or not ApplicationType 234: indicates the type of application using this storage. The application could be a database, groupware or a business application Availability 236: indicates the availability requirements; typically either 24×7 or 12×6

StorageType 238: in this example, we use only one storage type which is based on ESS Arrays attached to McData Directors DataTypes:

IpAddress 240: used to represent the ip address of a server

Classes:

AccountSolution 242: this captures information about the storage type (storagetype) used for each account (AccountName). It associates with a Solution object that captures the details of the solution Solution 244: this captures the details of the storage solution such as the server name (Servername), ip address (ServerAddress), the application type (applicationtype) and the operating system (platform). It associates with a StorageRequirements object that captures the storage requirements StorageRequirements 246: this class captures the storage requirements of the solution such as the alert level (alertlevel), availability (availability), backup requirements (backup type), failover (failover), RAID level (raidlevel) and security (security).

In general, the following methods are used to extract the necessary data from the data sources layer 62:

Extract data automatically based on the published interface and format of the data source If no such interface is available or if the format is unstructured and not well defined, use the following options:

Provide UI for manual entry of the data—this is suitable for data that can be entered once and is unchanging Automatically maintain the data—this is suitable for data that changes such as system configuration and state. Events that change the configuration or state can be captured, and the extracted data appropriately can be automatically updated.

Characterizer Layer 66

A storage request charaterizer 208 will query the DIME module 204 for the relevant information at each step of request processing (i.e. step 88 of FIG. 5). For the present example, "Extend file system A by 10 GB", the following queries will be performed:

Find the storage solution type used by that account based on the Account name

If the solution type is ESS storage arrays attached to McData Directors, query the DIME layer for the details of the solution and the requirements. If the solution type is different, the solution and requirement details will be different and need to be modeled similarly.

Query the DIME layer to get the current configuration and state information of the storage system The results 74 of these queries 70 are filled in the request by the Storage Request module 208. The results 74 are filled into the request 68 to create the annotated request 76. For example, for the request "Extend file system A by 10 GB" the following information gets added to the request:

Storage Type: ESS Array attached to Mc Data Director
ServerName: shark.ibm.com
ServerIp: 9.124.26.47
Application Type: Database
Platform: UNIX
Alert Level: 0
Availability: 24×7
Backup Type: Cold
Failover: Automatic
RaidLevel: RAID 0
Security: Non-encrypted
Type: File System
Volume Group: V1
Volume Group Size: 100 GB
Volume Group Free Space: 20 GB.

The patch request characterizer 210 shown in FIG. 4 is for patch management requests rather than service requests. These requests will have their own set of steps, data requirements, and data sources, but otherwise the methodology to handle them is identical.

Learning Component

Once changes are done following the process, analysis of any historical data can be done which may be collected about the changes with respect to request characterization. An example of how such information may be kept is given in Table 1.

TABLE 1

| Change # | Path 1 | Path 2 | Path 3 | Final Status |
| --- | --- | --- | --- | --- |
| C1 | x | | | Successful |
| C2 | | x | | Failed |
| C3 | | x | | Successful |
| C4 | | | x | Successful |

Now, any analysis tool can look at the number of cases in which the different paths were taken and try to build a model that can predict what is the most likely path for a future change request. An example of such an analysis is a learning technique like decision tree as described in *Induction of Decision Trees* published in "Machine Learning", Vol 1, Issue 1, Pages 81-106, 1986.

Such an analysis can also be used to access the risk pertaining to a change. Based on previous change requests of similar type on similar types of machines and their outcomes, it will learn the correlation of possible problems to the various parameters of the change. It can also learn about how long it will take for the change to be implemented.

For example, it can learn that "Extend file system" request on an AIX platform with point in time backup requirement" will take 2 hours and there is 5% probability of a problem. It can learn that 80% of time, the file system can be extended simply by allocating from the logical volume, 10% of time we need to extend the logical volume and another 10% of time we may need to add more physical volumes.

Standard data mining and correlation techniques can be used to learn this information from previous change requests. This information is then filled into the request, so that the person approving the request has all the information he needs. The actual decision tree and statistics to be learnt and filled into the request may vary based on the request type and the particular step in the processing. This information should also be captured in the modeling phase, so that it is known exactly what needs to be learnt.

Further Embodiments

Although the invention has been described in what is conceived to be the most practical and preferred embodiments, it is understood that further embodiments are within the scope of the invention. For example, the invention may equally be deployed in a client/server application environment; a distributed software application environment; or in a stand-alone application environment.

Various alterations and modifications can be made to the techniques and arrangements described herein, as would be apparent to one skilled in the relevant art.

We claim:

1. A computer-implemented method that populates a service request comprising:

receiving, at a change management computer system, said service request comprising a description of a change in a computing system and a history of said change in said computing system, wherein said change includes one of replacing, adding, upgrading and reconfiguring software components;

modeling, by a computing device, said service request to produce a modeled service request to determine steps involved in performing said service request;

assessing, by said computing device, missing data from said modeled service request for each of said steps involved in performing said modeled service request;

identifying, by said computing device, data sources for said modeled service request to produce identified data sources that contain at least a portion of said missing data;

extracting, by said computing device, relevant data from said identified data sources to produce extracted relevant data comprising said at least a portion of said missing data; and populating, by said computing device, said modeled service request with said extracted relevant data.

2. The computer-implemented method of claim 1, further comprising:

identifying, by said computing device, a type of said service requests request, and performing said modeling of said service request to determine the steps involved for each identified type of said service requests.

3. The computer-implemented method of claim 1, wherein said modeling said service request to determine the steps involved is performed on the basis of at least one of:
roles that perform activities;
information a role uses to perform an activity;
organizations that are involved in an activity; and
information captured.

4. The computer-implemented method of claim 3, wherein the missing data is assessed from the data required for each step of the service request and the data available in the service request.

5. The computer-implemented method of claim 4, wherein the data required for each step is determined from predetermined information, including domain knowledge.

6. A computer-implemented method that executes a service request comprising:
receiving, at a change management computer system, a service request involving process steps, said service request comprising a description of a change in a computing system and a history of said change in said computing system, wherein said change includes one of replacing, adding, upgrading and reconfiguring software components;
modeling, by said computing device, said service request to produce a modeled service request to determine steps involved in populating said service request;
assessing, by said computing device, missing data from said modeled service request for each of said steps involved in performing said modeled service request;
identifying, by said computing device, data sources for said modeled service request to produce identified data sources that contain at least a portion of said missing data;
extracting, by said computing device, relevant data from said identified data sources to produce extracted relevant data comprising said at least a portion of said missing data;
populating, by said computing device, said modeled service request with said extracted relevant data to produce a populated service request; and
executing, by said computing device, at least one process step acting on the populated service request.

7. The computer-implemented method of claim 6, further including identifying a type of service requests request, and performing said modeling of said service request to determine the steps involved for each identified type of said service requests.

8. The computer-implemented method of claim 6, wherein said modeling said service request to determine the steps involved is performed on the basis of at least one of:
roles that perform activities;
information a role uses to perform an activity;
organizations that are involved in an activity; and
information captured.

9. The computer-implemented method of claim 8, wherein the missing data is assessed from the data required for each step of the service request and the data available in the service request.

10. The computer-implemented method of claim 9, wherein the data required for each step is determined from predetermined information, including domain knowledge.

11. A change management computer system for automatically populating a service request, said change management computer system including a processor that:
models said service request to produce a modeled service request to determine steps involved in performing said service request, said service request comprising a description of a change in a computing system and a history of said change in said computing system, wherein said change includes one of replacing, adding, upgrading and reconfiguring software components;
assesses missing data from said modeled service request for each of said steps involved in performing said modeled service request;
identifies data sources for said modeled service request to produce identified data sources that contain at least a portion of said missing data;
extracts relevant data from said identified data sources to produce extracted relevant data comprising said at least a portion of said missing data; and
populates said modeled service request with said extracted relevant data.

12. The system of claim 11, wherein the processor initially identifies the type of service requests request, and performs said modeling of said service request to determine the steps involved for each identified type of said service requests.

13. The system of claim 11, wherein said modeling is performed by the processor on the basis of at least one of:
roles that perform activities;
information a role uses to perform an activity;
organizations that are involved in an activity; and
information captured.

14. The system of claim 13, wherein the missing data is assessed from the data required for each step of the service request and the data available in the service request.

15. The system of claim 14, wherein the data required for each step is determined from predetermined information, including domain knowledge.

16. A computer storage medium readable by a computer tangibly embodying a program of instructions executable by said computer for performing a method, said method comprising:
receiving a service request involving process steps at a change management computer system;
modeling said service request to produce a modeled service request to determine the steps involved in performing said service request, said service request comprising a description of a change in a computing system and a history of said change in said computing system, wherein said change includes one of replacing, adding, upgrading and reconfiguring software components;
assessing missing data from said modeled service request for each of said steps involved in performing said modeled service request;
identifying data sources for said modeled service request to produce identified data sources that contain at least a portion of said missing data;
extracting relevant data from said identified data sources to produce extracted relevant data comprising said at least a portion of said missing data; and
populating said service request with said extracted data.

17. A computer storage medium readable by a computer tangibly embodying a program of instructions executable by said computer for performing a method, said method comprising:
receiving a service request involving process steps at a change management computer system;
modeling said service request to produce a modeled service request to determine steps involved in performing said service request, said service request comprising a description of a change in a computing system and a history of said change in said computing system, wherein said change includes one of replacing, adding, upgrading and reconfiguring software components;

assessing what data is missing from said modeled service request for each of said steps involved in performing said modeled service request;

identifying data sources for said modeled service request to produce identified data sources that contain at least a portion of said missing data;

extracting relevant data from said identified data sources to produce extracted relevant data comprising said at least a portion of said missing data;

populating said modeled service request with said extracted relevant data to produce a populated service request; and executing at least one process step acting on the populated service request.

* * * * *